United States Patent

Walter

(10) Patent No.: US 6,636,009 B2
(45) Date of Patent: Oct. 21, 2003

(54) FAULT-TOLERANT ELECTROMECHANICAL ACTUATING DEVICE

(75) Inventor: Alexander Walter, Augsburg (DE)

(73) Assignee: Renk Aktiengesellschaft, Augsburg (DE)

(*) Notice: Subject to any disclaimer, the term of this patent is extended or adjusted under 35 U.S.C. 154(b) by 0 days.

(21) Appl. No.: 10/027,009

(22) Filed: Dec. 20, 2001

(65) Prior Publication Data

US 2002/0093298 A1 Jul. 18, 2002

(30) Foreign Application Priority Data

Dec. 22, 2000 (DE) .......................... 100 64 673

(51) Int. Cl.$^7$ ................................. G05B 9/03
(52) U.S. Cl. ..................... 318/564; 318/563; 318/34
(58) Field of Search .................. 318/34, 139, 564, 318/563, 565; 74/640, 724, 425; 476/27, 35; 123/185.11

(56) References Cited

U.S. PATENT DOCUMENTS

| | | | | | |
|---|---|---|---|---|---|
| 3,143,693 A | * | 8/1964 | Fearnside et al. | ........... | 318/564 |
| 3,156,855 A | * | 11/1964 | Righton et al. | ............. | 318/564 |
| 3,379,951 A | * | 4/1968 | Franchi et al. | .............. | 318/564 |
| 3,505,929 A | * | 4/1970 | Coppola et al. | ............ | 318/564 |
| 3,702,575 A | | 11/1972 | Campbell | ................. | 91/363 A |
| 3,708,735 A | * | 1/1973 | Barltrop | ..................... | 318/564 |
| 4,035,705 A | * | 7/1977 | Miller | ........................ | 318/564 |
| 4,095,763 A | * | 6/1978 | Builta | ........................ | 318/564 |
| 4,105,900 A | * | 8/1978 | Martin et al. | ................ | 318/564 |
| 4,159,444 A | * | 6/1979 | Bartlett et al. | ............... | 318/564 |
| 4,162,438 A | * | 7/1979 | Osder | ......................... | 318/564 |
| 4,546,437 A | | 10/1985 | Bleckmann et al. | ........ | 364/426 |
| 5,493,497 A | * | 2/1996 | Buus | .......................... | 318/564 |
| 5,670,856 A | * | 9/1997 | Le et al. | ..................... | 318/564 |
| 5,747,950 A | * | 5/1998 | Friedrichsen et al. | ....... | 318/564 |
| 6,095,277 A | | 8/2000 | Bohner et al. | .............. | 180/403 |
| 6,275,752 B1 | | 8/2001 | Giers | .......................... | 701/29 |

FOREIGN PATENT DOCUMENTS

| | | | | |
|---|---|---|---|---|
| DE | 198 33 460 | 1/2000 | | |
| EP | 0 977 098 | 2/2000 | ............ | G05B/9/03 |

* cited by examiner

Primary Examiner—Robert E. Nappi
Assistant Examiner—Eduardo Colon-Santana
(74) Attorney, Agent, or Firm—Cohen, Pontani, Lieberman & Pavane

(57) ABSTRACT

A fault-tolerant electromechanical actuating device for converting an electrical actuating signal into a mechanical output actuating value for use in vehicles, having two mutually independent control loops. Each loop has at least one controller and at least one electric motor which is driven by this controller and which, in each case via a self-locking transmission, drives the input to a summing transmission, which superimposes the actuating values of the actuating motors to form the output actuating value. The fault tolerance or reliability of the actuating device is ensured by a comparator controller, which monitors the functions of the other controllers. Interfaces between the controllers and between the subsystems ensure stringent isolation of electrical potential.

10 Claims, 1 Drawing Sheet

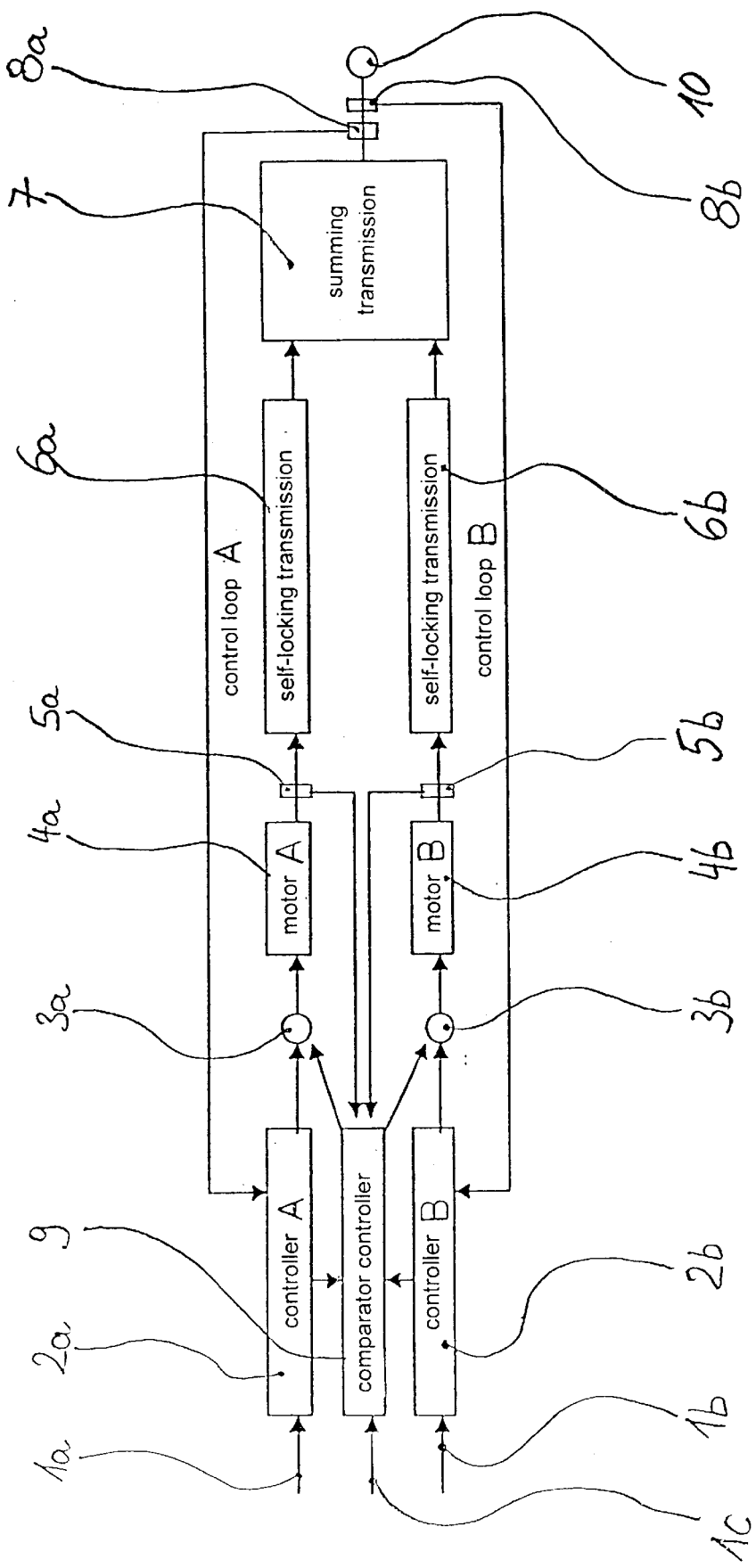

FAULT-TOLERANT ELECTROMECHANICAL ACTUATING DEVICE

BACKGROUND OF THE INVENTION

1. Field of the Invention

The invention relates to a fault-tolerant electromechanical actuating device for converting an electrical actuating signal into a mechanical output actuating value for use in vehicles, having two mutually independent control loops. Each control loop has a controller, an electric motor driven by the controller and providing an actuating value; and a self-locking transmission driven by the motor. A summary transmission driven by the self-locking transmissions superimposes the actuating values of the actuating motors to form a mechanical output actuating value.

2. Description of the Related Art

DE 198 33 460 discloses a fault-tolerant steering actuator having an electronic closed-loop/open-loop control transmission, which generates steering signals for an electric actuating motor. The steering actuator has an electronic closed-loop/open-loop control transmission which is subdivided into two subsystems, each having a step-down transmission which is connected to the output side of an actuating motor and on which output angles are summed in a common step-up transmission. The output shaft of the step-up transmission is led to the steering transmission and is provided with an angle sensor. The torques of the actuating motors are dimensioned in such a way that they can perform the steering task completely on their own in each case, so that a fail-safe characteristic is provided. The motors of the subsystems are each driven by a power output stage which, in turn, receives its enable signal from both process computers. In this case, the enable signal is prioritized by the other process computer in each case not belonging to the subsystem, in order to be able to drive the respective power output stage by means of the intact process computer in the event of a defect in the process computer of this subsystem. In order to be able to detect faults, each process computer additionally has to calculate the control data of the other subsystem in parallel with its own.

If a process computer fails, then the corresponding control loop is taken out of operation. Furthermore, it may be part of the failure pattern for this defective process computer to switch off the other control loop as well, via its prioritized enable signal, and therefore to switch off any actuating function.

Electrical faults in a subsystem in this arrangement can also be transmitted to the other subsystem via the measuring lines.

SUMMARY OF THE INVENTION

The object of the invention is to avoid these weaknesses and to increase the fault tolerance of an electromechanical actuating device further, so that the actuating device remains completely serviceable even when a fault occurs.

This object is achieved by the addition of a comparator controller which monitors the functions of the control loops, and interfaces between the controllers and the loops which electrically isolate the loops from each other.

As a result of the advantageous digital communication according to the invention between the controllers, the additional comparator controller also receives the sensor values from these controllers and, by using the input signal which is likewise supplied, monitors the functions of the two controllers. In addition, the control data from the control loops can be exchanged via the digital communication between all the controllers. The preferably optical design of the digital communication achieves stringent isolation of the electrical potentials of the loops.

However, if a control loop fails, the comparator controller then interrupts the controlled section of the faulty channel. The motor of the faulty branch can therefore both be idling and stationary. As a result of the self-locking transmission, the faulty branch always remains at a standstill. The intact branch can continue to fulfil the control task via the summing transmission.

The possibility that the comparator controller fails and stops both circuits is prevented by the technical design of the enabling means. The enabling means or drive of the enabling means is designed in such a way that when one of the two enabling means is opened (that is to say interrupts the control loop), in every case the other enabling means necessarily closes (that is to say enables this control loop). Therefore, even in the event of a defective comparator, the function of the actuating device is ensured. The internal design of the comparator with two relays ensures that the control loop still functions even when part of the enable circuit (one relay) fails.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The figure shows, in the manner of a block diagram, the important components of a fault-tolerant actuating device according to the invention, and its functional connection.

DETAILED DESCRIPTION OF THE PRESENTLY PREFERRED EMBODIMENTS

On an actuator, such as a steering wheel, accelerator pedal or brake pedal, the actuating value is picked up by means of three mutually independent sensors and, via three data buses —for example CAN buses—is supplied as input signals $1a$, $b$ and $c$ separately from one another to the controllers $2a$, $b$ and to the comparator controller 9. Via digital communications links, the controllers $2a$, $b$ can forward their own input signals $1a$, $b$ to the comparator controller 9 which, in the event of a deviation of one of the input signals $1a$ or $1b$ with respect to the other two, can interrupt the corresponding control loop.

A preferred design provides for all the controllers $2a$, $b$ and 9 to forward their own input signals $1a$, $b$ and $c$ to the respective other two controllers, so that each controller $2a$, $b$ and 9 can continue to operate with the correct input value, using a two from three selection, in the event of deviations between the input signals $1a$, $b$ and $c$—for example because of a defective sensor on the actuator. This advantageously increases the fault tolerance of the entire system, since the control task is still executed by two control loops even in the event of failure of a sensor. In this state, the actuating device could tolerate a further fault in a control loop and would continue to operate reliably with the other control loop.

From the input signals 1a/b together with predefined values —stored in the controllers 2a/b —the controllers 2a/b determine a desired actuating value for the output 10. The comparator controller 9 determines the desired values for the motors 4a/b of the two control loops A/B from its input value 1c and the predefined values stored in it.

The controllers 2a/b each drive an electric motor 4a/b, in each case via an enabling means 3a/b, and, together with the motors 4a/b, self-locking transmissions 6a/b and a summing transmission 7 and sensors 8a and 8b, in each case form a control loop A/B for setting the desired mechanical output value 10. By means of the sensors 8a, b, the current value of the mechanical output 10 is picked up and fed back as a signal to the controllers 2a/b, in order to drive the respective motor 4a/b appropriately after a desired/actual comparison. As a result of the use of two mutually independent sensors 8a, b on the output shaft, stringent isolation of the electrical potential of the two control loops is advantageously provided, in addition to redundancy.

In normal operation, both control loops A/B operate together when setting the output value 10, and both electric motors 4a/b drive the input to the summing transmission 7 independently of one another via respective self-locking transmissions 6a/b for example a worm drive transmission —the summing transmission 7 superimposing these two input values on each other and feeding them to its output shaft as an output value 10.

The mechanical output 10 is connected, for example, to a steering transmission, a brake or other equipment in a vehicle. The output shaft of the summing transmission 7 can, for example, also drive the zero shaft of a track-laying vehicle gearbox, in order to control regenerative steering.

The summing transmission 7 used is preferably an epicyclical gear transmission, a lever system also being possible as an alternative.

Both motors 4a/b and the entire control loops A/B are designed in such a way that they can each set the output value 10 on their own.

By means of the comparator controller 9, the functions of the individual control loops A/B are continually checked. For this purpose, sensors 5a and b are provided on the motor shafts or input shafts of the transmissions 6a/b, pick up the current values present there and supply them to the comparator controller 9. These current values are compared with the desired values determined as already described above and, if the comparator controller 9 establishes that there are deviations, it interrupts the associated control loop A/B by opening its enabling means 3a or b. The sensors 5a and b can also each be arranged on the output of the self-locking transmission 6a/b.

The motor 4a/b of the switched-off, faulty branch may either be idling or in the stationary state; the self-locking transmission 6a/b ensures that this input drive to the summing transmission 7 is blocked. The intact control loop A/B can continue to fulfil the control task via the summing transmission 7.

In the event of a fault or failure of the comparator controller 9, there would be the risk that both control loops A/B would be interrupted via the enabling means 3a/b. However, this is prevented by the technical design of the enabling means. The enabling means or drive of the enabling means is designed in such a way that when an enabling means 3a/b is opened, that is to say a control loop A/B is interrupted, the other enabling means 3a/b necessarily closes, and therefore the other control loop A/B can carry out the actuating function. This ensures that, even when a comparator controller 9 is defective, at least one control loop A/B will adjust the output value 10.

In order to fulfil this purpose, the enabling means is preferably designed with two relays, which are switched separately from each other by the comparator circuit 9 and, in each case when pulled in, enable one of the control loops A/B. On both relays, the contact which is switched in the failed state in each case enables the other control loop A/B.

This ensures that in the event of a malfunction of the comparator controller 9, and a failure of both relays resulting from this, both control loops A/B continue to remain closed and therefore fulfil their control function. Even if a relay fails and remains hanging between the switching contacts, at least one of the control loops A/B is enabled by the other relay.

Therefore, in the event of failure of an electronic or electrical component, the reliable function of the actuating device is advantageously ensured.

A significant core idea in the present invention is the stringent electrical potential isolation between the controllers 2a, 2b and 9 and between the control loops A and B, which prevents electrical faults within a subsystem being able to be transmitted to others as well. It is preferable for all the communications interfaces between the controllers 2a and 2b and the comparator controller 9 to be designed using optocouplers.

A further possibility is to implement the controllers 2a, 2b, 9 with optical conductors or other electrically isolating elements, such as signal transformers.

Furthermore, a higher-order diagnostic system is provided, to which all faults are reported via the data buses, preferably CAN buses. Therefore, the functions of all electrical components, such as the sensors 5a/b, 8a/b, the motors 4a, b, the controllers 2a/b, 9 and also the sensors on the actuators for generating the input signals are monitored. In addition, missing "live" signals from the digital communications electronics (even on the data buses) are recognized as faults. Depending on how significant the fault or faults registered is or are categorized by the diagnostic system in accordance with its predefinitions, it can stop the vehicle or merely display a fault message.

The two control loops A, B are supplied with power separately from each other, a dedicated rechargeable accumulator preferably being provided for each control loop A, B. In the case of a central power supply with a rechargeable accumulator, buffers separated from each other must be provided for both control loops A, B, permitting the continued operation of the actuating device, at least until the vehicle is brought to a standstill, in the event of failure of the rechargeable accumulator, and at the same time ensuring stringent potential isolation of the control loops A, B.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. An electromechanical actuating device for converting an electromechanical actuating signal into a mechanical output actuating value for a vehicle, said apparatus comprising two mutually independent control loops, each control loop comprising a controller, an actuating motor driven by the controller, a self-locking transmission driven by the actuating motor and providing an actuating value of the motor, and a common summing transmission which is driven by the self-locking transmissions and superimposes the actuating values of the actuating motors to form a mechanical output actuating value, a comparator controller which monitors the control loops, and interfaces between the comparator controller and each of the controllers of the control loops, and between the control loops, the control loops being electrically isolated from each other.

2. An electromechanical actuating device as in claim 1 wherein said interfaces are optoelectronic interfaces.

3. An electromechanical actuating device as in claim 1 wherein the controllers and the control loops comprise optical conductors.

4. An electromechanical actuating device as in claim 1 wherein each said controller receives an independent input signal generated by an independent sensor.

5. An electromechanical actuating device as in claim 1 wherein said interfaces between said controllers exchange data by means of digital communication.

6. An electromechanical actuating device as in claim 1 further comprising a data bus connected to each said controller, and a higher order diagnostic system connected to the data buses for monitoring the functions of all electrical and electronic components.

7. An electromechanical actuating device as in claim 1 wherein each said control loop can set a desired value of the mechanical output actuating value.

8. An electromechanical actuating device as in claim 7 further comprising a dedicated relay in each said control loop, said relays being separately switched by said comparator circuit so that, when one of said control loops is switched off, the other one of said control loops is necessarily switched on.

9. An electromechanical actuating device as in claim 1 further comprising a sensor in each of said control loops which senses the actuating value of the motor and supplies it to the comparator controller, and a pair of sensors which sense the mechanical output actuating value and supply the value to respective said contollers of the control loop.

10. An electromechanical actuating device as in claim 9 wherein, based on said sensed values, said comparator controller can switch off a faulty control loop.

* * * * *